United States Patent
Presley et al.

(10) Patent No.: US 9,539,948 B1
(45) Date of Patent: Jan. 10, 2017

(54) TELESCOPING STEP ASSIST SYSTEM AND METHOD

(71) Applicant: JAC Products, Inc., Saline, MI (US)

(72) Inventors: Michael J. Presley, Plymouth, MI (US); Conde M. Gonzalez, Utica, MI (US); Giuseppe Cappellino, Tecumseh (CA); Sean M. LeFrancois, Windsor (CA)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 15/077,616

(22) Filed: Mar. 22, 2016

(51) Int. Cl.
*B60R 3/02* (2006.01)
*E04F 11/06* (2006.01)

(52) U.S. Cl.
CPC ............... *B60R 3/02* (2013.01); *E04F 11/068* (2013.01)

(58) Field of Classification Search
CPC .............. B60R 3/00; B60R 3/007; B60R 3/02; E04F 11/04; E04F 11/06; E04F 11/068
USPC ............... 280/163, 164.1, 166, 169; 182/127
See application file for complete search history.

(56) References Cited

U.S. PATENT DOCUMENTS

| | | |
|---|---|---|
| 4,004,695 A | 1/1977 | Hockensmith et al. |
| 4,021,055 A | 5/1977 | Okland |
| 4,057,942 A | 11/1977 | Kranefeld et al. |
| 4,094,230 A | 6/1978 | Wright et al. |
| 4,167,272 A | 9/1979 | Wright et al. |
| 4,240,521 A * | 12/1980 | Naka ................... E06C 9/08 182/100 |
| 4,253,256 A | 3/1981 | Feliz |
| 4,309,854 A | 1/1982 | Vendramini |
| 4,318,488 A | 3/1982 | Rathi |
| 4,403,421 A | 9/1983 | Shepherd |
| 4,406,375 A | 9/1983 | Hockensmith |
| 4,424,828 A | 1/1984 | Zellinger et al. |
| 4,498,263 A | 2/1985 | Bocker |
| 4,568,808 A | 2/1986 | Thuries et al. |
| 4,584,776 A | 4/1986 | Shepherd |
| 4,589,076 A | 5/1986 | Fujioka |
| 4,646,794 A | 3/1987 | Padarev et al. |
| 4,660,731 A | 4/1987 | Becker |
| 4,674,261 A | 6/1987 | Sabel |
| 4,699,281 A | 10/1987 | Kishi |
| 4,733,598 A | 3/1988 | Innes et al. |
| 4,793,437 A | 12/1988 | Hanthorn |
| 4,809,472 A | 3/1989 | Hade, Jr. et al. |
| 4,932,176 A | 6/1990 | Roberts et al. |

(Continued)

*Primary Examiner* — John Walters
(74) *Attorney, Agent, or Firm* — Harness, Dickey & Pierce, P.L.C.

(57) ABSTRACT

The present disclosure relates to a telescoping step system which has at least one stringer assembly having telescopically coupled first and second tubular components. The second tubular component is telescopically extendable relative to the first tubular component. The stringer assembly is operably associated with a structure. The system further has at least one step assembly associated with one of the first and second tubular components. The stringer assembly is telescopically collapsible into a retracted position to form a compact assembly either adjacent to or within a portion of the structure, and extendable into an extended position extending outwardly from the structure. In the extended position the stringer assembly presents the step assembly as a platform which a user is able to step on to, and thus aids the user with ingress into and egress from the structure.

20 Claims, 17 Drawing Sheets

(56) References Cited

U.S. PATENT DOCUMENTS

| | | |
|---|---|---|
| 4,944,656 A | 7/1990 | Feng et al. |
| 4,944,711 A | 7/1990 | Hironaka et al. |
| 5,110,250 A | 5/1992 | Kuo |
| 5,135,074 A | 8/1992 | Hornagold |
| 5,148,717 A | 9/1992 | Yamaguchi |
| 5,191,828 A | 3/1993 | McCreery |
| 5,226,853 A | 7/1993 | Courgeon |
| 5,238,287 A | 8/1993 | Haddad, Jr. |
| 5,259,664 A | 11/1993 | Cottle |
| 5,286,049 A | 2/1994 | Khan |
| 5,423,650 A | 6/1995 | Zerbst et al. |
| 5,489,114 A | 2/1996 | Ward et al. |
| 5,513,825 A | 5/1996 | Gutgsell |
| 5,584,645 A | 12/1996 | Kaspar |
| 5,632,395 A | 5/1997 | Zimmermann |
| 5,669,562 A | 9/1997 | Smith |
| 5,718,345 A | 2/1998 | Hade, Jr. |
| 5,731,987 A | 3/1998 | Strong et al. |
| 5,813,552 A | 9/1998 | Kaspar |
| 5,877,693 A | 3/1999 | Eyler |
| 5,926,961 A | 7/1999 | Uhl |
| 5,930,934 A | 8/1999 | Fisher et al. |
| 5,938,395 A | 8/1999 | Dumont, Jr. |
| 6,050,579 A | 4/2000 | Selland et al. |
| 6,062,404 A | 5/2000 | Erdmann |
| 6,176,672 B1 | 1/2001 | Egan et al. |
| 6,185,875 B1 | 2/2001 | Victor et al. |
| 6,186,347 B1 | 2/2001 | Reifenscheid et al. |
| 6,199,325 B1 | 3/2001 | Winship |
| 6,199,707 B1 | 3/2001 | Suzuki et al. |
| 6,280,086 B1 | 8/2001 | Stijns |
| 6,305,820 B1 | 10/2001 | Poon |
| 6,575,318 B2 | 6/2003 | Stowasser et al. |
| 6,641,355 B1 | 11/2003 | McInerney et al. |
| 6,641,358 B2 | 11/2003 | Schmidt, V et al. |
| 6,830,257 B2 | 12/2004 | Leitner |
| 6,938,909 B2 | 9/2005 | Leitner |
| 6,942,233 B2 | 9/2005 | Leitner et al. |
| 6,942,427 B1 | 9/2005 | Srinivasan |
| 6,955,370 B2 | 10/2005 | Fabiano et al. |
| 7,007,961 B2 | 3/2006 | Leitner et al. |
| 7,055,839 B2 | 6/2006 | Leitner |
| 7,118,120 B2 | 10/2006 | Lee et al. |
| 7,168,721 B2 | 1/2007 | Mulder |
| 7,182,175 B1 | 2/2007 | Schmitt et al. |
| 7,311,320 B2 | 12/2007 | Kuntze et al. |
| 7,318,596 B2 | 1/2008 | Scheuring, III et al. |
| 7,334,807 B2 | 2/2008 | Mulder et al. |
| 7,377,531 B2 | 5/2008 | Fabiano et al. |
| 7,380,807 B2 | 6/2008 | Leitner |
| 7,398,985 B2 | 7/2008 | Leitner et al. |
| 7,412,759 B1 | 8/2008 | Hsieh et al. |
| 7,413,204 B2 | 8/2008 | Leitner |
| 7,566,064 B2 | 7/2009 | Leitner et al. |
| 7,600,731 B2 | 10/2009 | Pasto |
| 7,635,247 B2 * | 12/2009 | Collins .................. B60R 9/06 414/462 |
| 7,788,858 B1 | 9/2010 | Ammons |
| 7,909,344 B1 | 3/2011 | Bundy |
| 7,909,520 B2 | 3/2011 | Barab |
| 8,002,298 B2 * | 8/2011 | Casbolt et al. ........... B60R 3/02 280/163 |
| 8,136,826 B2 | 3/2012 | Watson |
| 8,156,266 B2 | 4/2012 | Agnihotri et al. |
| 8,182,470 B2 | 5/2012 | Devengenzo et al. |
| 8,276,326 B2 | 10/2012 | Lounis et al. |
| 8,322,580 B1 | 12/2012 | Hamilton |
| 8,448,968 B1 | 5/2013 | Grote et al. |
| 8,558,881 B2 | 10/2013 | Yu et al. |
| 8,590,951 B2 | 11/2013 | Calabro |
| 8,641,700 B2 | 2/2014 | Devengenzo et al. |
| 8,695,760 B2 | 4/2014 | Winter, IV |
| 8,714,575 B2 | 5/2014 | Watson |
| 8,777,074 B2 | 7/2014 | DeMers et al. |
| 8,844,957 B2 | 9/2014 | Leitner et al. |
| 8,893,905 B2 | 11/2014 | Stuhrwoldt |
| 9,161,526 B2 | 10/2015 | Nipper |
| 9,198,488 B2 | 12/2015 | Pronzati et al. |
| 9,221,401 B2 | 12/2015 | Birkenstock |
| 2001/0018586 A1 | 8/2001 | Cosmescu |
| 2002/0056693 A1 | 5/2002 | Stowasser et al. |
| 2003/0127408 A1 | 7/2003 | Schneider |
| 2005/0005562 A1 | 1/2005 | Henderson et al. |
| 2005/0053465 A1 | 3/2005 | Roach et al. |
| 2005/0152749 A1 | 7/2005 | Anres et al. |
| 2005/0269159 A1 | 12/2005 | Lin |
| 2009/0211174 A1 | 8/2009 | Henderson et al. |
| 2009/0218444 A1 | 9/2009 | Lahargou et al. |
| 2009/0269179 A1 | 10/2009 | Gale et al. |
| 2010/0160814 A1 | 6/2010 | Parihar |
| 2010/0307870 A1 | 12/2010 | Zimmerman |
| 2011/0036084 A1 | 2/2011 | Mallan et al. |
| 2011/0225903 A1 | 9/2011 | Lounis et al. |
| 2012/0127300 A1 | 5/2012 | Yu et al. |
| 2012/0152880 A1 | 6/2012 | Stuhrwoldt |
| 2012/0193167 A1 | 8/2012 | Winter, IV |
| 2012/0209292 A1 | 8/2012 | Devengenzo et al. |
| 2013/0284010 A1 | 10/2013 | Allard et al. |
| 2013/0305627 A1 | 11/2013 | Pike et al. |
| 2014/0059949 A1 | 3/2014 | Lounis |
| 2014/0163581 A1 | 6/2014 | Devengenzo et al. |
| 2014/0264213 A1 | 9/2014 | Nipper |
| 2015/0008207 A1 | 1/2015 | Habe et al. |
| 2015/0113884 A1 | 4/2015 | Klingenberg |
| 2015/0135454 A1 | 5/2015 | Conway et al. |
| 2015/0144583 A1 | 5/2015 | Matsumoto |
| 2015/0211250 A1 | 7/2015 | Bach |

\* cited by examiner

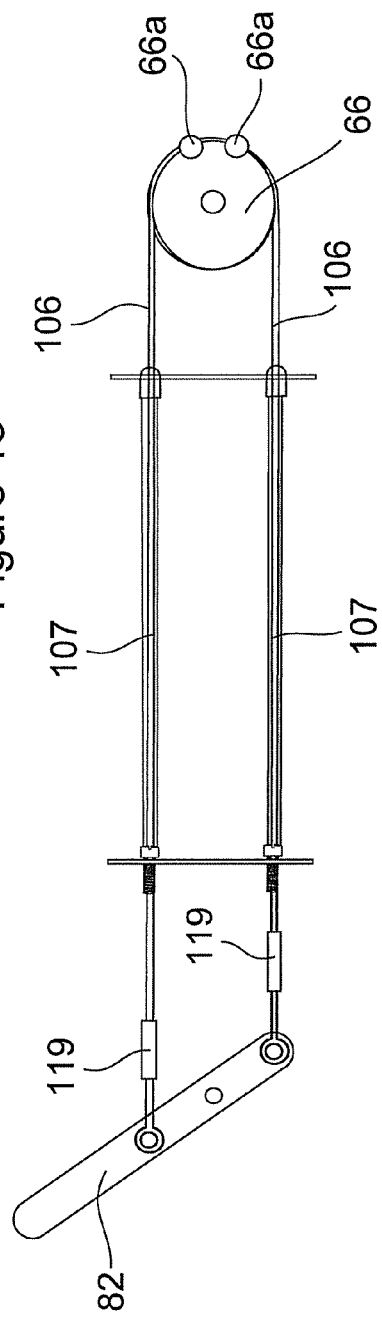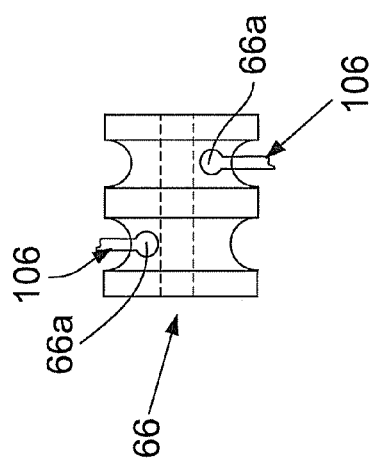

TELESCOPING STEP ASSIST SYSTEM AND METHOD

FIELD

The present invention relates generally to assist steps used with vehicles, and more particularly to a telescoping step system having pivotally mounted steps which pivot between stowed and deployed positions as stringers supporting the steps move telescopically between retracted and extended positions.

BACKGROUND

It is known to provide a step assist platform or bar to promote ingress and egress of a vehicle. Typically, most present day step assist platforms are fixedly mounted relative to a frame portion of the vehicle and thus do not articulate. Furthermore, the single, fixedly mounted step assist platform is often disposed at a height that is not practical for all users. Moreover, present day step assist platforms can be subject to high capacity load resulting in deflection or possibly even failure.

Present day articulating step systems are also known and typically employ some type of four bar linkage arrangement. The four bar linkage arrangement is used to deploy and retract a single step bar. The step bar is typically retracted under a rocker panel area of the vehicle, and when deployed extends out from the rocker panel area adjacent a vehicle door. However, such systems typically only make use of a single step, which does not necessarily provide an optimal and comfortable means of ingress and egress relative to an interior area of the vehicle. With modern day vehicles such as vans, pickup trucks and SUVs, RV's, buses, trains, planes, heavy equipment and other vessels requiring ingress and egress of occupant(s), often it would be more comfortable for occupants to be able to use two or more steps when entering or exiting a vehicle. This is so for people of smaller stature, and especially so for small children.

Therefore, it is desirable to provide a telescopic step assist system that supports a relatively high capacity load. It is also desirable to provide a telescoping step assist system that affords the user with two or more steps, such that a smaller step height for each step can be implemented, to thus significantly ease ingress into and egress from a vehicle. Such a step system would also need to be relatively compact when in its stowed or fully retracted orientation, would need to be easily mounted to some suitable portion or substructure of a vehicle (such as to a frame portion of the vehicle), but not necessarily limited to only frame mounting.

Other objects, features and advantages of the present invention will be readily appreciated, as the same becomes better understood, after reading the subsequent description taken in conjunction with the accompanying drawings.

SUMMARY

In one aspect the present disclosure relates to a telescoping step system comprising at least one stringer assembly having at least first and second tubular components. The second tubular component is telescopically extendable relative to the first tubular component. The at least one stringer assembly is operably associated with a structure. The system further may comprise at least one step assembly associated with one of the first and second tubular components. The at least one stringer assembly is telescopically collapsible into a retracted position to form a compact assembly at least one of adjacent to the structure or within a portion of the structure, and telescopically extendable into an extended position extending outwardly from the structure. In the extended position the at least one stringer assembly presents the at least one step assembly in an orientation which is easily accessible as a platform on which a user is able to step on to, and thus aids the user with ingress into and egress from the structure.

In another aspect the present disclosure relates to a telescoping step system. The system may comprise at least one stringer assembly having at least first and second tubular components, where the second tubular component is telescopically extendable relative to the first tubular component, and where the at least one stringer assembly is operably associated with a structure to allow easier ingress to and egress from the structure. The system may also include a first actuator subsystem for causing telescopic movement of the at least one stringer assembly between extended and retracted positions. At least one step assembly may also be included which is associated with one of the first and second tubular components. The at least one step assembly may be pivotally operatively coupled to the at least one stringer assembly and movable from a stowed position to an operative position. A second actuator subsystem may be included for causing pivoting motion of the at least one step assembly between the stowed position and the operative position. The at least one stringer assembly may be positioned to be telescopically collapsible into the retracted position to form a compact assembly at least one of adjacent to the structure or within a portion of the structure, and telescopically extendable into the extended position extending outwardly from the structure to present the at least one step assembly in an orientation which is easily accessible as a platform on which a user is able to step on to. In this manner the step assembly aids the user with ingress into and egress from the structure. The at least one step assembly is pivotally movable in response to control by the second actuator subsystem, to position the at least one step assembly in either the stowed or operative positions when the at least one stringer assembly is telescopically moved into the retracted or extended positions, respectively.

In still another aspect the present disclosure relates to a method for controlling motion of a movable step associated with a fixed structure. The method may comprise supporting at least one stringer assembly having at least first and second tubular components from the structure, where the second tubular component is telescopically extendable relative to the first tubular component. The method may also involve supporting at least one step assembly from one of the first and second tubular components so that the at least one step assembly is pivotally movable from a stowed position to an operative position, and wherein in the operative position the at least one step assembly forms a platform on which a user may step. The method may also involve using a first actuator subsystem to cause telescopic motion of the at least one stringer assembly between extended and retracted positions, and using a second actuator subsystem to cause pivotal movement of the at least one step assembly between stowed and operative positions. When the at least one stringer assembly is moved telescopically into the extended position the at least one step assembly will be pivotally moved into the operative position to form the platform upon which the user is able to step.

BRIEF DESCRIPTION OF THE DRAWINGS

The drawings described herein are for illustrative purposes only of selected embodiments and not all possible implementations, and are not intended to limit the scope of the present disclosure.

FIG. 13 a high level block diagram showing how one spool is coupled to a pair of multistrand cables to allow rotation of the spool in either rotational direction, depending on how the multistrand cables are actuated;

FIG. 14 is an elevation view of one of the spools illustrating the two grooved surfaces which allow a pair of the multistrand cables to be secured thereto in 180 degree opposite orientations;

DETAILED DESCRIPTION

To achieve one or more of the foregoing objects, the present disclosure provides a telescoping step assist system and method. One embodiment of the telescoping step assist system includes a plurality of steps. Each of the telescoping sections has a portion of each rotating step attached to it. The telescoping step assist system is stowed underneath or inside the vehicle and includes either a hydraulic drive mechanism or an electric drive mechanism that extends and retracts the steps of the system adjacent a lower area of the vehicle. The telescoping step assist system may also include a dual action hydraulic drive mechanism, or an all-electric drive system, for extending and retracting the telescoping sections each at approximately the same rate of speed, or at different speeds. The telescoping step assist system may also include either a hydraulic drive system or an electric drive system that rotates each step from a stowed vertical position into a usable horizontal position. The steps may be rotated substantially simultaneously at the same rotational speeds, or they may be rotated at different time intervals and/or at different rotational speeds.

One advantage of the disclosed system and method is that a new telescoping step assist system is provided to support a relatively high capacity load, but is yet a highly compact system when in its stowed orientation. Another advantage of the disclosed is that it allows even more comfortable and convenient ingress and egress relative to the interior area of a vehicle. Yet another advantage of the present invention is that it does not introduce significant added weight to a vehicle with which it is used, and does not require modification of the frame structure of the vehicle. As such, the system disclosed herein can be installed on vehicles as they are manufactured or may be retrofitted onto existing vehicles without significant modification to the frame structure of most existing vehicles.

Figure 1:
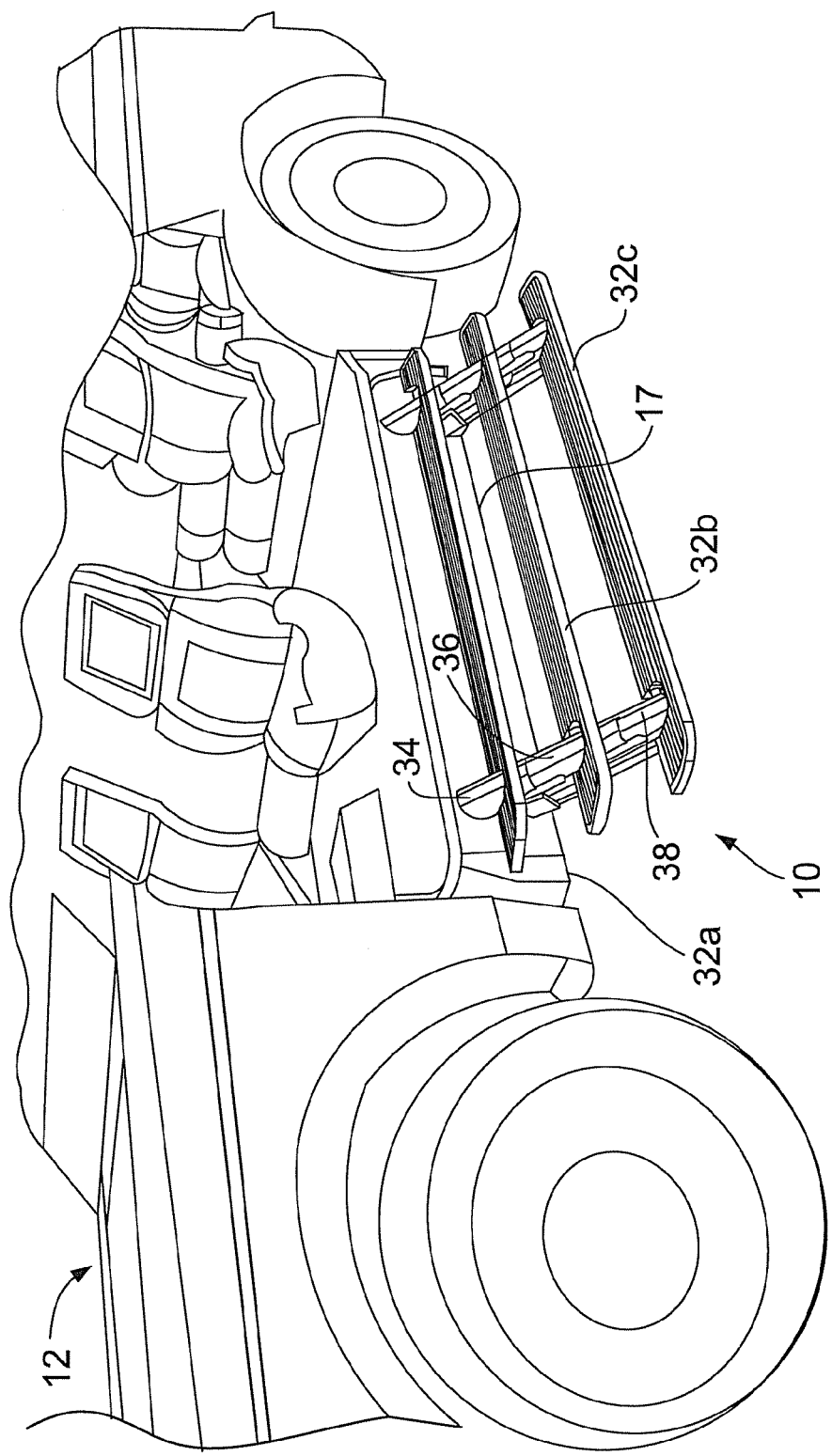
FIG. 1 shows a perspective view of one embodiment of a telescoping step assist system in accordance with the present disclosure secured to a frame portion of a motor vehicle, with the system shown in an extended or deployed position.
Figure 1A:
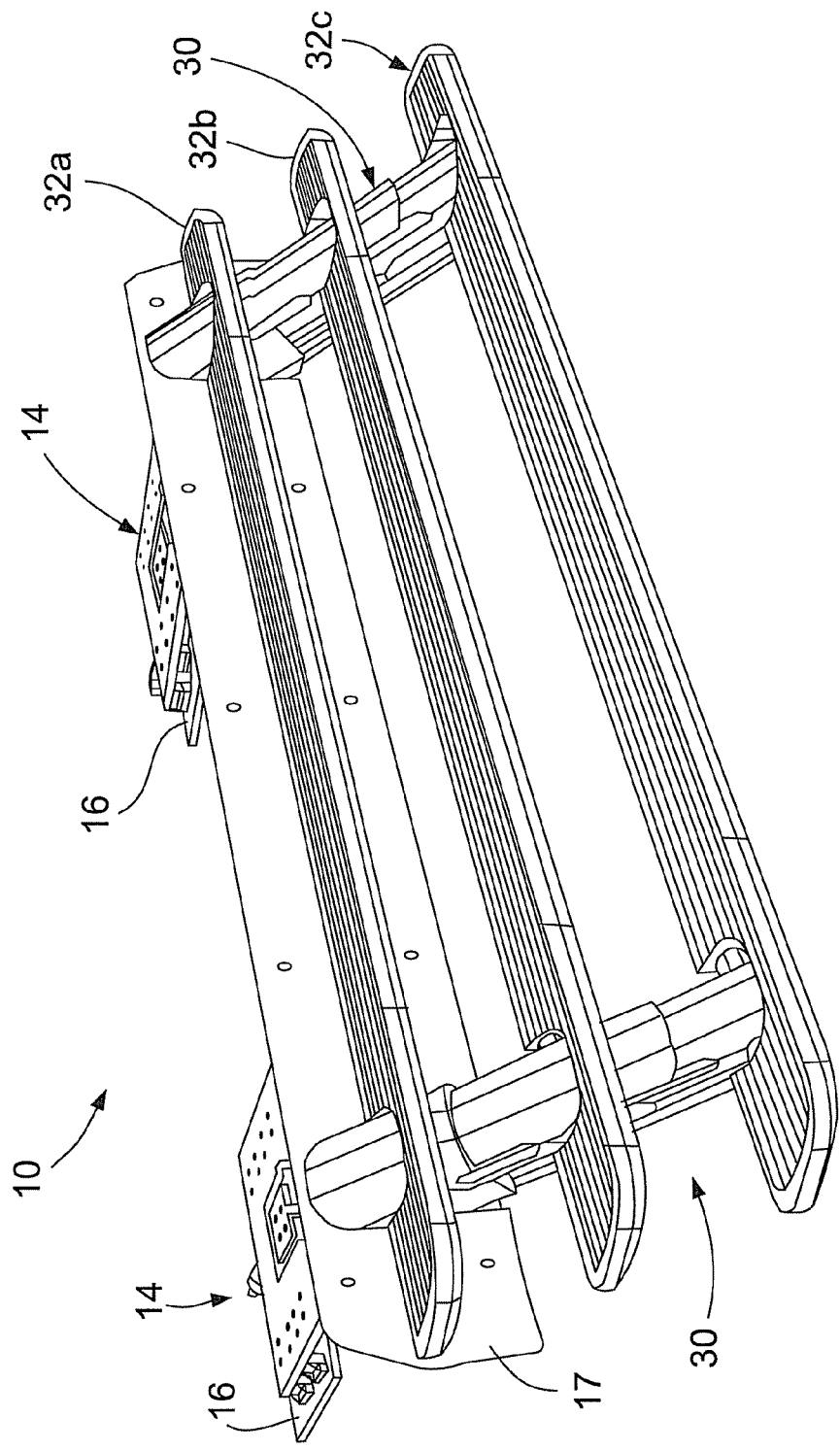
FIG. 1a shows the telescoping step assist system of FIG. 1 with additional components being visible which are used to secure the system to the frame portion of the vehicle shown in FIG. 1.
Figure 2:
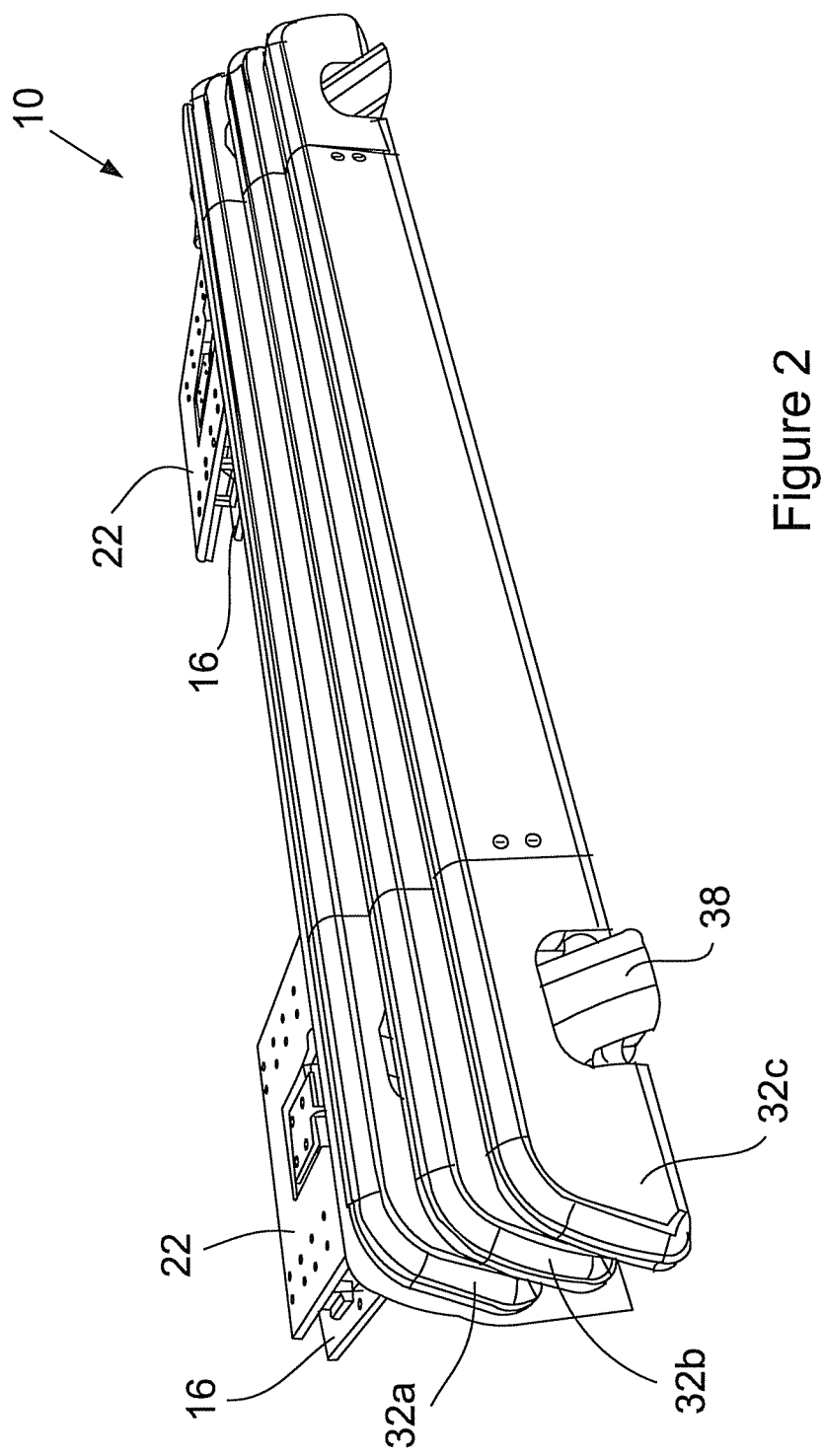
FIG. 2 is another perspective view of the telescoping step assist system of FIG. 1 showing the system in a retracted position.

Referring now to the drawings, and in particular FIGS. 1, 1a and 2, one embodiment of a telescoping step assist system 10 (hereinafter simply "system 10") according to the present disclosure, is shown for use with a vehicle 12. It will be appreciated that while the vehicle 12 is shown in FIG. 1 as an SUV, that the system is also expected to find use on a wide variety of other vehicles or structures where a user needs to step up one or more steps for ingress or egress to the structure, and where it is desirable to retract the steps before operation of the vehicle or structure. As such, the system 10 may find utility with motor homes, aircraft or rotorcraft, trains, heavy equipment (e.g., earth moving equipment), farm equipment such as tractors, combines, etc., and even watercraft. The system 10 may also find utility with fixed structures such loading docks at warehouses where it would be convenient to provide a telescopically retractable step system to augment use of the loading dock. It will be appreciated, then, that the system 10 is not limited to use with any one single type of vehicle or structure.

Referring to FIGS. 1, 1a and 2, the system 10 in this example includes a pair (plurality) of identical mounting mechanisms, each indicated at 14, for rigidly mounting the system 10 to a suitable portion of a mounting surface of a structure. Of course, in some applications only one such mounting system may be required. In other applications it may be desirable to provide more than two mounting systems 14. In one implementation the support surface may be portions of a frame of the vehicle 12. The mounting mechanisms 14 each include mounting plates 16. The mounting plates 16 in this example are planar and preferably made of a structurally strong material such as metal. The mounting plates 16 are each secured to a suitable mounting surface (e.g., portion of a frame of the vehicle 12 or other structure) by suitable fasteners (not shown) extending through the mounting plates 16. A vanity plate 17 may be included to provide a pleasing appearance and to help block portions of the mechanical components from view when the system 10 is in its extended (deployed) orientation. The system 10 is shown in FIGS. 1 and 1a in its extended or deployed position, and in FIG. 2 in its retracted or stowed position. It will also be appreciated that the system 10 may be mounted so as to be positioned within a portion of a structure, and does not necessarily need to be mounted to an external surface of the structure. The only requirement is that the mounting is such that the system 10 can operate to telescopically extend and retract without interference from any portion of the structure (i.e., any portion of the vehicle or fixed structure).

Figure 3:
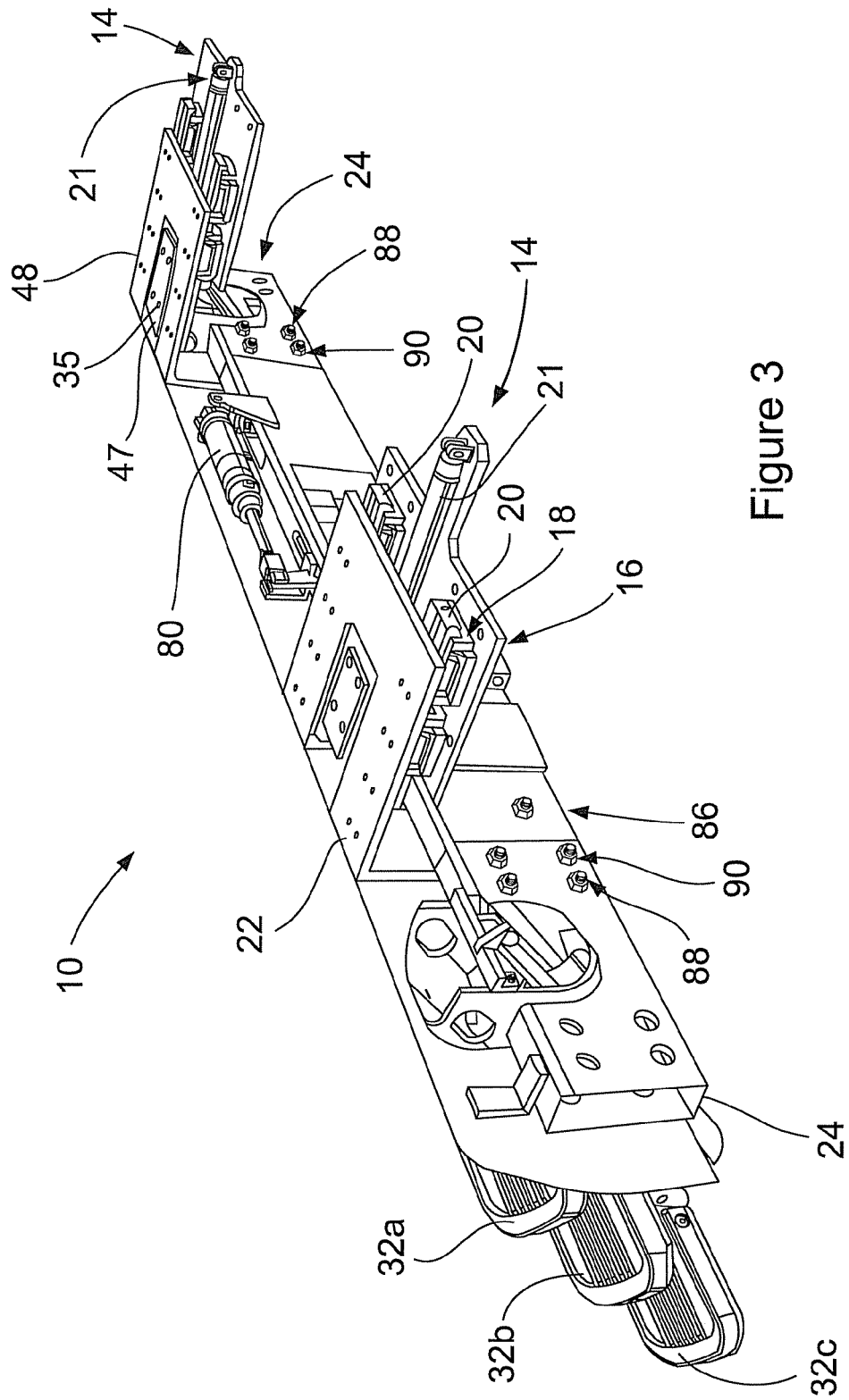
FIG. 3 is a perspective view of the system similar to that shown in FIG. 1, but from an inboard perspective to illustrate various additional components of the system.

Referring to FIG. 3, the mounting plates 16 may contain a plurality of ball bearing carriage assemblies 18 made of steel and secured to the support surface by suitable fasteners extending through the ball bearing carriage assemblies 18 and threaded into the mounting plates 16. The ball bearing carriage assemblies 18 provide precision motion along the Y-axis (i.e., cross car). Linear guide rails 20 are contained within the ball bearing carriage assemblies 18. The linear guide rails 20 in this example are made of steel and are planar. It should be appreciated that in the embodiment illustrated in the figures, the ball bearing carriage assemblies 18 allow the system 10 to provide precision, low-friction, quiet, linear motion in the cross-car direction. A pair of actuators 21, which may each be an hydraulically driven actuator or an electrically driven linear actuator, or even pneumatically driven (i.e., air driven) actuators, is provided for providing linear translating movement of a portion of the system 10 outwardly (away from the rocker panel area of the vehicle 12), as well as inwardly (toward the rocker panel area). This operation will be described more fully in the following paragraphs. It will be appreciated however, that the system 10 may be used without the linear translating movement provided by actuators 21.

Linear guide rails 20 are secured to angle plates 22 by suitable fasteners extending through the linear guide rails 20 and threaded into the angle plates 22. Angle plates 22 are generally 90 degree sections made of steel. Tube extenders 24 are generally rectangular box sections. Tube extenders 24 are secured to angle plates 22 by suitable threaded fasteners 26 extending through the angled plates 22 and the tube extenders 24, and retained with threaded nuts 28.

With further reference to FIGS. 1, 1*a* and 2, the system 10 can be seen to also include a pair of stringer assemblies 30 and a plurality of step assemblies 32*a*-32*c*. While three step assemblies 32*a*-32*c* are shown, it will be appreciated that the system 10 could use one, two, four or more such step assemblies, and therefore is not limited to using only three such assemblies. However, it is anticipated that for most passenger vehicle applications involving cars and trucks, three independent step assemblies will be optimal for providing comfortable ingress to, and egress from, the vehicle's interior. For large industrial equipment it may be desirable to use more than three such step assemblies, depending largely on the height of the cabin of the vehicle above the ground surface. FIG. 2 particularly shows that the step assemblies 32*a*-32*c* form a highly compact assembly when in the retracted (stowed) orientation.

Figure 4:
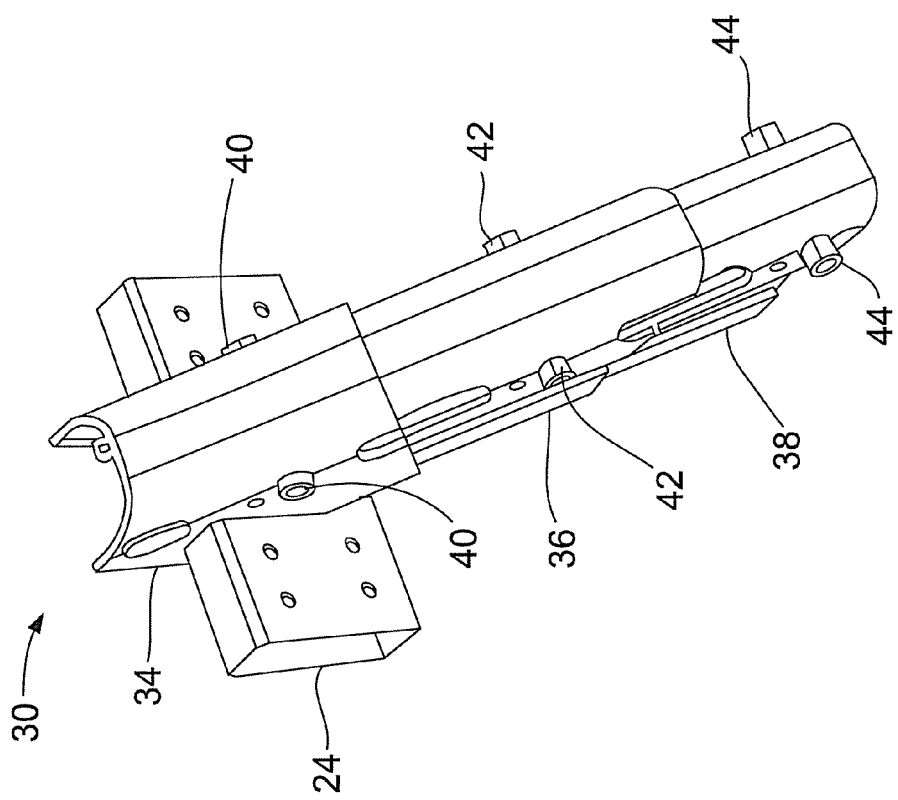
FIG. 4 is an outboard perspective view of one of the telescoping stringer assemblies used with the system showing the telescoping stringer assembly in an extended orientation.
Figure 5:
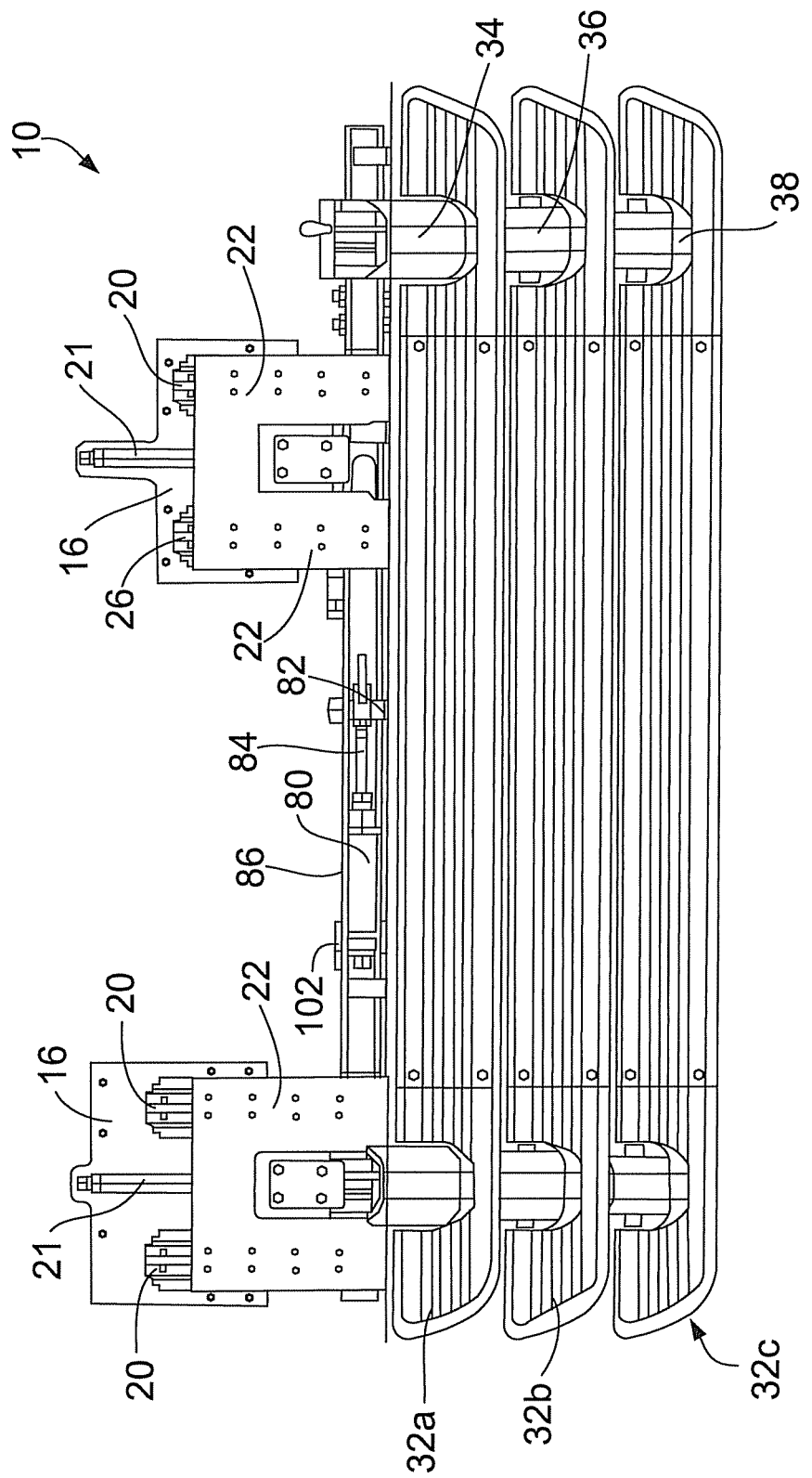
FIG. 5 is a plan view of the telescoping step assist system of FIG. 1.
Figure 6:
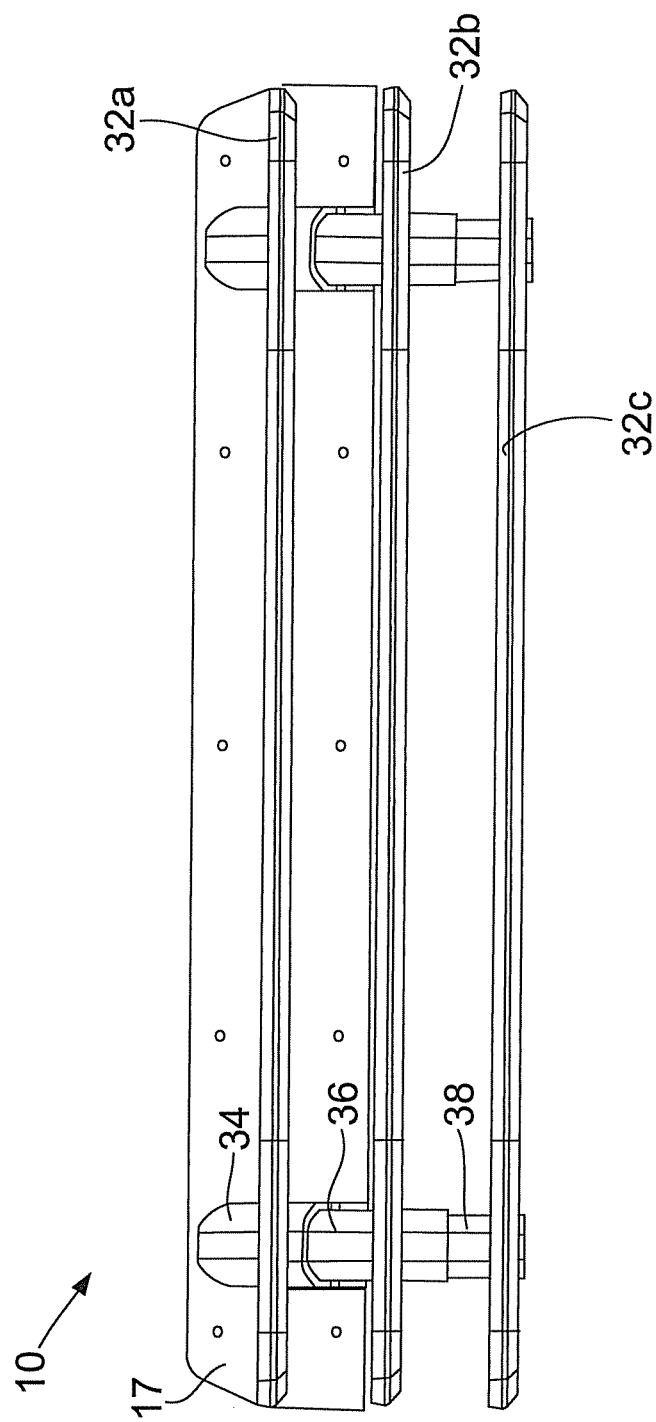
FIG. 6 is a front elevational view of the telescoping step assist system of FIG. 1.

Referring to FIG. 4, one of the stringer assemblies 30 can be seen in greater detail. Each stringer assembly 30 includes an outer tube 34, one of the tube extenders 24, a mid tube 36 telescopically mounted to the outer tube 34, and an inner tube 38 telescopically mounted to the mid tube 36. The tube extender 24 is fixedly secured to the outer tube 34 such as be welding or possibly by a suitable plurality of threaded fasteners. The outer tube 34 also includes a pair of longitudinally aligned standoffs 40 which are threaded into threaded openings in the outer tube. Similarly, the mid tube 36 includes a separate pair of fixedly secured, longitudinally aligned standoffs 42 threaded mounted on the mid tube, and the inner tube 38 includes its own pair of fixedly secured, longitudinally aligned standoffs 44 threaded mounted on the inner tube. The stringer assemblies 30 can also be seen in FIGS. 5-7.

Figure 7:
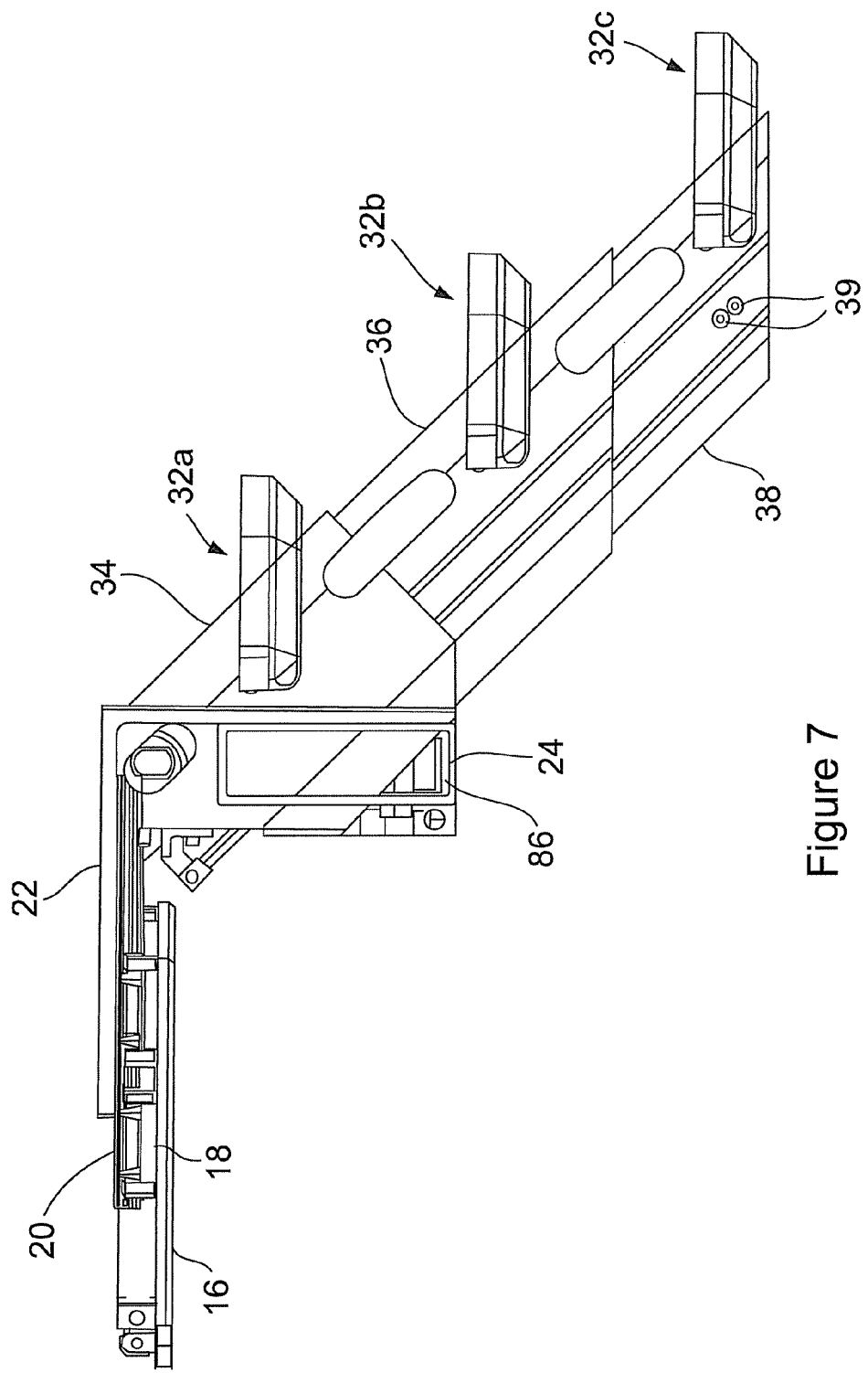
FIG. 7 is an end view of the telescoping step assist system of FIG. 1.
Figure 12:
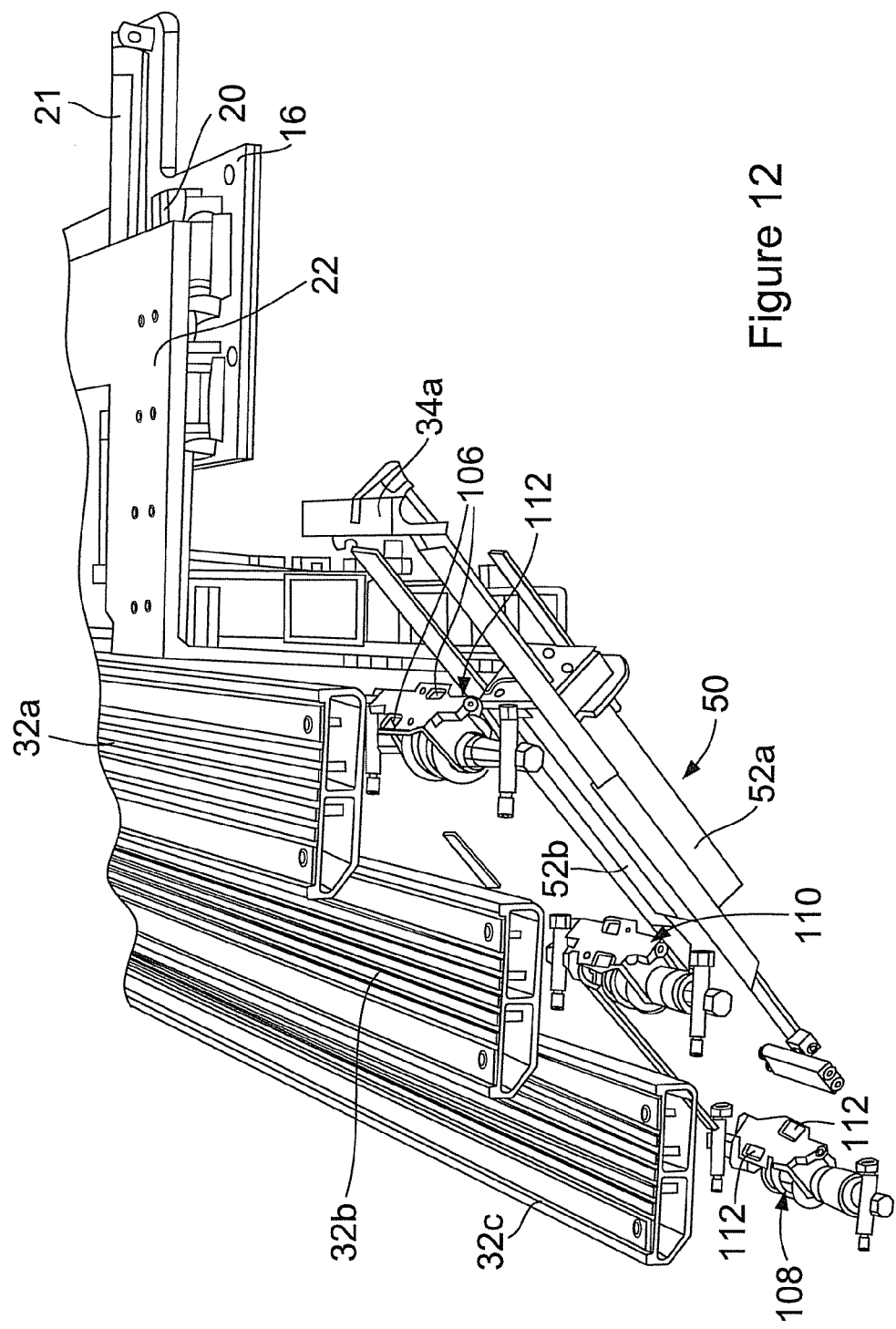
FIG. 12 is another perspective view of a representative portion of the telescoping step assist system of FIG. 1, used with one of the stringers, without the tube sections of the stringer being illustrated.
Figure 12A:
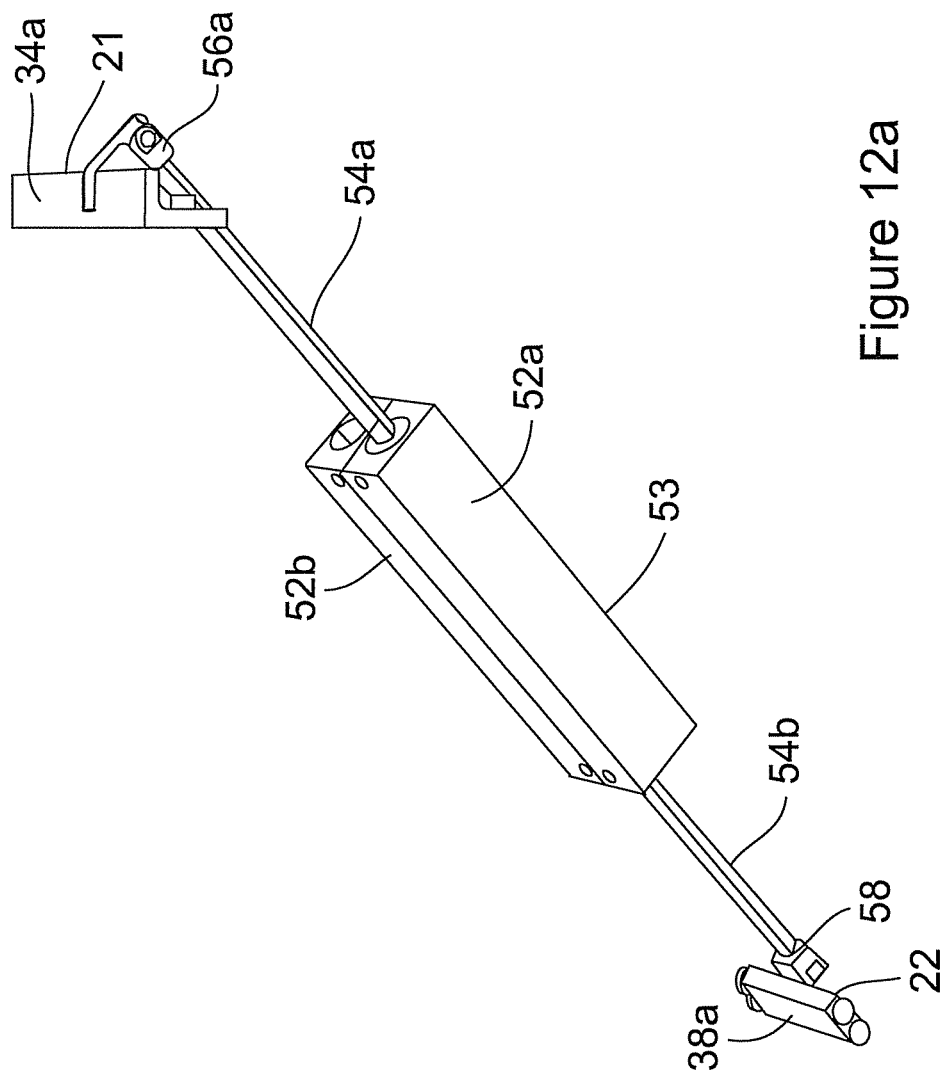
FIG. 12a is another perspective view of just the dual action hydraulic cylinders of the telescopic assist system of FIG. 12 and their associated actuator rods.

Referring briefly to FIGS. 12 and 12*a*, the system 10 also includes a telescopic drive mechanism, generally indicated at 50, to extend and retract each stringer assembly 30. The telescoping drive mechanism 50 consists of two opposing dual action hydraulic cylinders 52*a* and 52*b* securely mounted to the mid tube 36 of the stringer assembly 30 by suitable fasteners. The dual action hydraulic cylinders 52*a*/52*b* make use of a drive mechanism which is formed in part by inboard and outboard articulating rods 54*a* and 54*b*, respectively. It should be appreciated that the dual action hydraulic cylinders 52*a*/52*b* are conventional and well known in the art. It should also be appreciated that each stringer assembly 30 contains the pair of dual action hydraulic cylinders 52*a*/52*b*, opposed, and mounted to function as an integral, single subsystem as shown in FIG. 12*a*. An inboard end 56 of an articulating dual action hydraulic cylinder rod 54*a* is attached to a mount 34*a* associated fixedly with the outer tube 34. An outboard end 58 of an articulating dual action hydraulic cylinder rod 54*b* is attached fixedly to the inner tube 38 via a mount 38*a*. Threaded fasteners 39, visible in FIG. 7, are received in threaded bores in the mount 38*a* and enable the mount to be secured to the inner tube 38. In this example, the drive action of each dual action hydraulic cylinder 52*a* and 52*b* transfers fluid volumes within the closed system of the cylinders' chambers, thereby extending and/or retracting the outer tube 34 and inner tube 38 in a constant manner as related to the mid tube 36. Since the two dual action hydraulic cylinders 52*a*/52*b* are mounted within the mid tube 36, when the cylinder rods 54*a* and 54*b* are simultaneously extended, this causes simultaneously extending movement of the mid tube 36 relative to the outer tube 34, and of the inner tube 38 relative to the mid tube 36, which makes for extremely rapid deployment of the stringer assemblies 30 into their fully extended positions. Likewise, when the cylinder rods 54*a* and 54*b* are simultaneously retracted, this causes retracting movement of the mid tube 36 relative to the outer tube 34, as well as simultaneous retracting movement of the inner tube 38 relative to the mid tube 36, which makes for a rapid retracting motion of the stringer assemblies 30 into their stowed positions.

Figure 8:
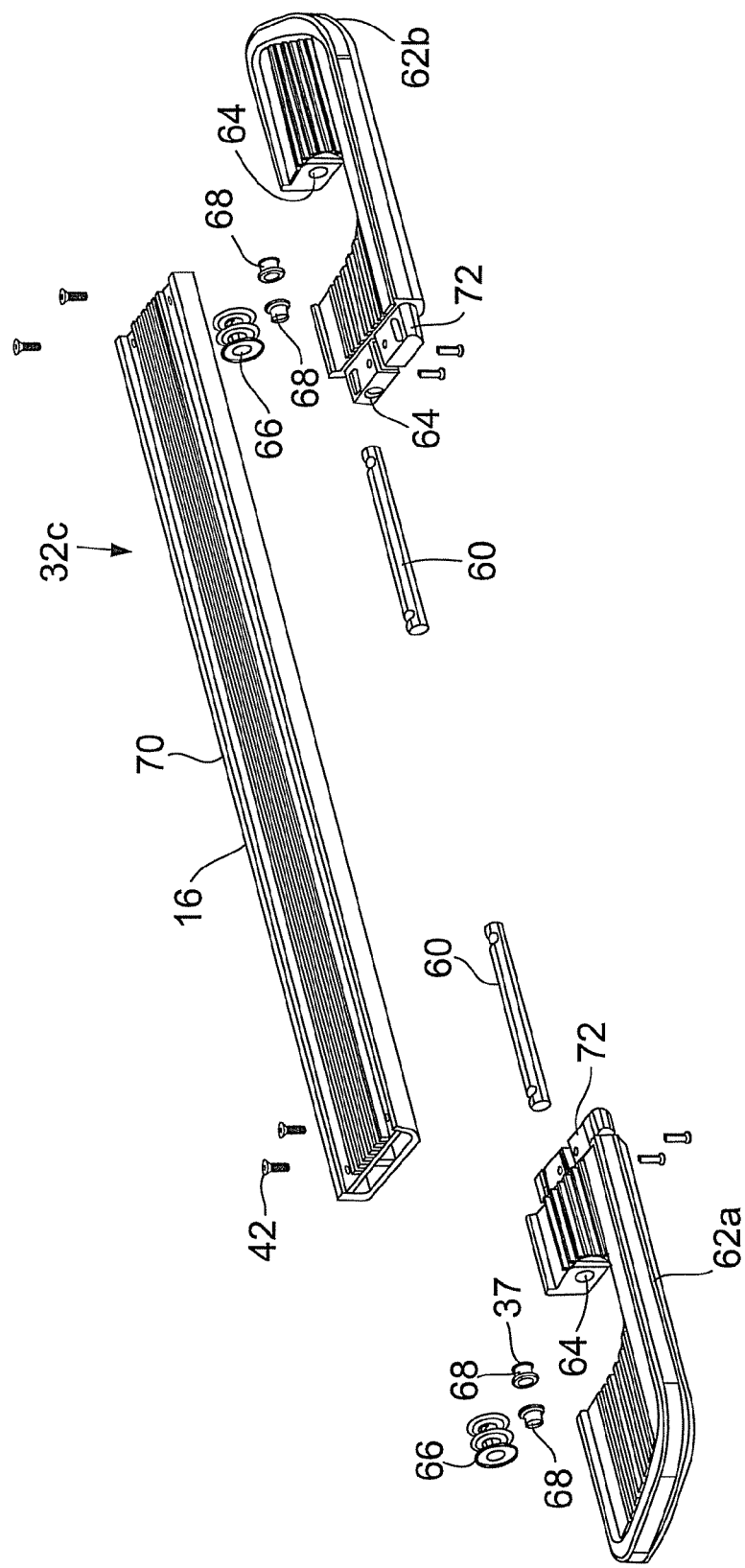
FIG. 8 is an exploded perspective view of just one step assembly of the system of FIG. 1.

With reference to FIGS. 1*a* and 7, the outer tube 34 can be seen to support the step assembly 32*a*, the mid tube 36 can be seen to support the mid tube 32*b*, and the inner tube 38 can be seen to support the step assembly 32*c*. With reference to FIGS. 4 and 8, the pairs of standoffs 40, 42 and 44 provide smooth inner bearing surfaces through which D-shaft hinge pins 60 are inserted and rotate. As shown in FIG. 8, one pair of D-shaft hinge pins 60 functions as a pivoting axis by which step assembly 32*c* is rotated generally 90 degrees from a vertical (i.e., retracted or stowed) position to a horizontal (i.e., extended or deployed) position, and vice-versa. The D-shaft hinge pins 60 associated with step assemblies 32*a* and 32*b* function in identical fashion to that described for step assembly 32*c*.

With reference to FIG. 8, step assembly 32*c* can also be seen to include a pair of step ends 62*a* and 62 having through bores 64 for receiving the D-shaft hinge pins 60. With brief reference to FIG. 10, the D-shaft hinge pins 60 are each secured for non-rotational movement by a pair of shouldered fastener hinge pins 60*a* extending through keyway features of each of the D-shaft hinge pins, and threaded into the step ends 62*a* and 62*b*. Referring further to FIG. 8, a central step member 70 is positioned between the step ends 62*a* and 62*b* receives neck portions 72 of each step end 62*a* and 62*b*. Threaded screws 74 are used to secure the step ends 62*a* and 62*b* to opposing ends of the central step member 70. The construction of step assemblies 32*b* and 32*a* are identical to that described above for step assembly 32*c*.

Figure 9:
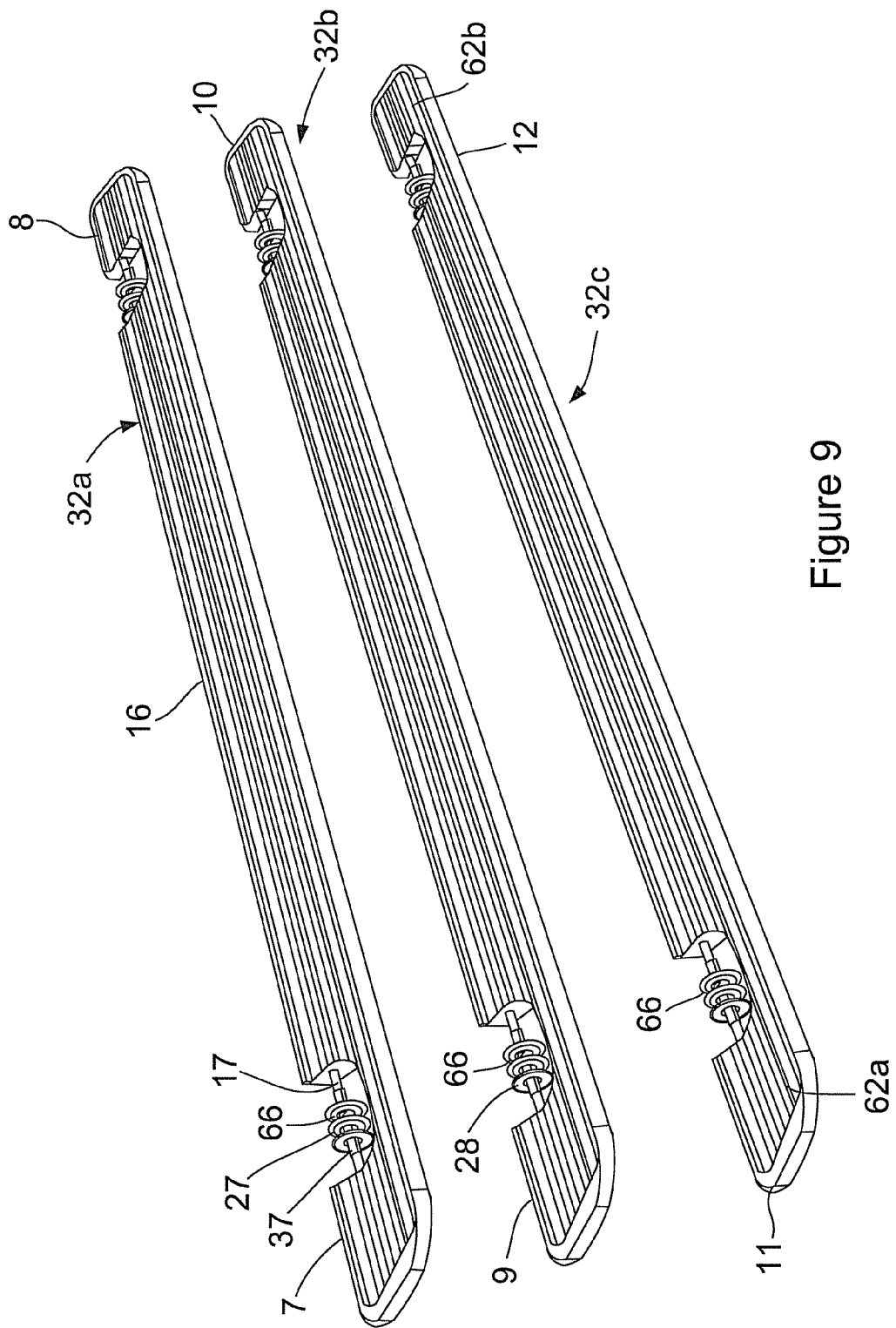
FIG. 9 is a perspective view showing just the three step assemblies of the telescoping step assist system of FIG. 1.
Figure 10:
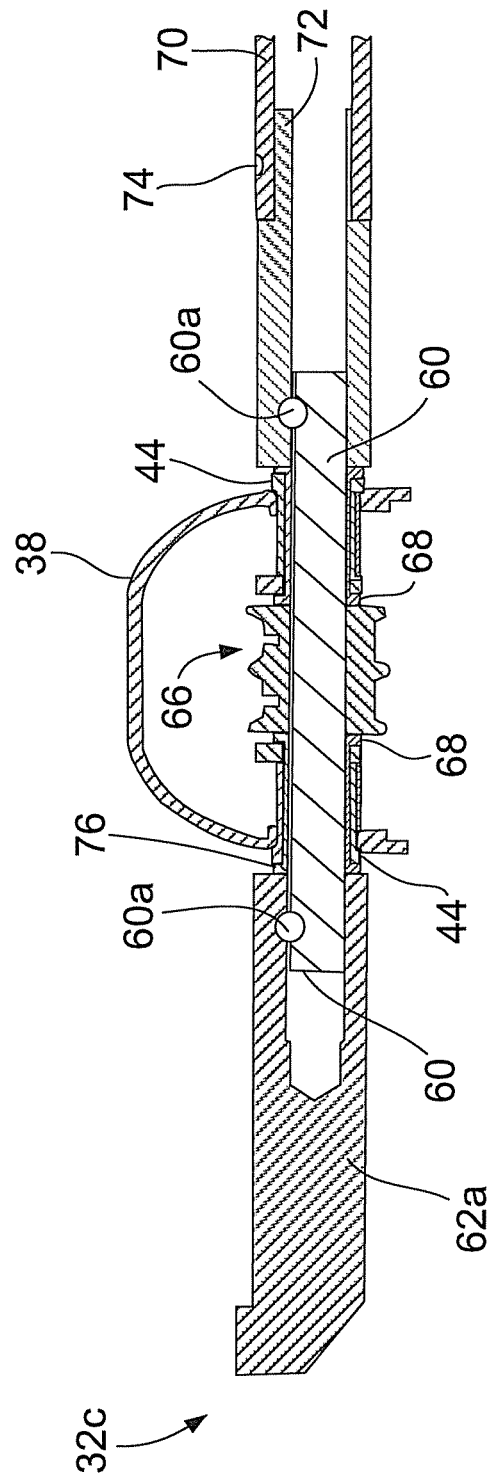
FIG. 10 is a typical section through a D-shaft hinge pin of the telescoping step assist system of FIG. 1.

With reference to FIG. 10, one end of step assembly 32*c* can be seen in greater detail. It will be appreciated that the opposite end of step assembly 32*c* with step end 62*b* has the identical construction. FIG. 10 shows that an additional bearing 76 is used to help support and provide a low friction rotation of the step end 62*a* during extending or retracting rotational movement of the step assembly 32*c*. The spool 66 can also be seen housed within an interior area of the inner tube 38 with the assistance of the standoffs 44. FIG. 9 shows the step assemblies 32*a*, 32*b* and 32*c* without the tubes 34, 36 and 38 to illustrate that the spool 66 of each step assembly is aligned along a common linear plane to permit a cable assembly to simultaneously rotate the step assemblies 32*a*-32*c* during when extending or retracting the step assemblies. It will be appreciated that the system shown in the art merely represents one drive method for rotating the step assemblies. Other embodiments may include using a rack and pinion configuration, worm gear and/or hydraulic/pneumatic rotary actuation to rotate the step assemblies 32*a*-32*c*. As such, it will be appreciated that the system 10 is not limited to only one specific type of subsystem for providing the rotation of the step assemblies 32*a*-32*c*.

Figure 11:
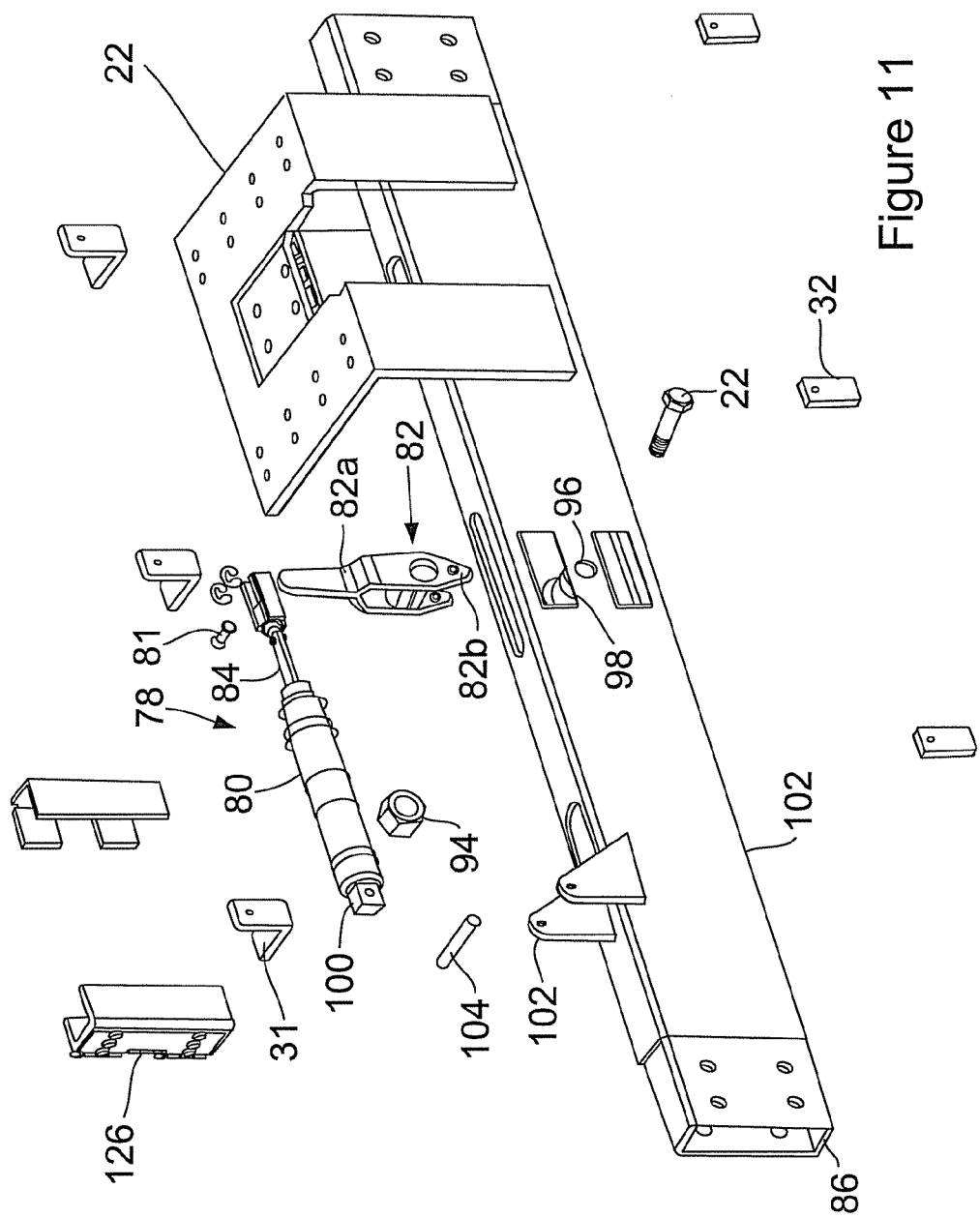
FIG. 11 is another exploded perspective view of a portion of the telescoping step assist system of FIG. 1.

As shown in FIGS. 3 and 11, in one embodiment a hydraulic drive mechanism 78 is used to provide rotational actuation of the step assemblies 32*a*-32*c*. The drive mechanism includes a hydraulic cylinder 80. The fluid lines to the hydraulic cylinder 80 have been omitted for clarity. A cable lever 82 is attached to a clevis of an articulating rod 84 of the hydraulic cylinder 80 via pin 81. Multistrand cables (not shown), mounted to upper portion 82*a* and lower portion 82*b* of the cable lever 82 are routed through a rear tube 86 of the system 10. Rear tube 86 is also visible in FIG. 3. The rear tube 86 has tube extenders 24 attached to its opposite ends via threaded screws 88 and nuts 90 as shown in FIG. 3. The rear tube 86 is secured to the angle plates 22. In this manner, the actuators 21 can be used to translate the rear tube 86, and thus the stringers 30 and steps 32*a*-32*c*, outwardly and inwardly a small distance relative to the vehicle 12. The distance is in accordance with the degree of linear travel of the actuators 21, but in one embodiment of the system 10 is about four to eight inches. Obviously, this distance may be modified by selecting actuators having a different maximum length of travel.

With further reference to FIG. 11, the cable lever 82 is supported for pivotal movement and secured to the rear tube 86 by a threaded screw 92 and nut 94. A pair of thrust washers 96 (only one being partially visible) and a pair of sleeve bushings 98 may also be used to help provide smooth pivoting motion of the cable lever 82. An end portion 100 of the hydraulic cylinder 80 is fixedly secured to arm portions 102, which are in turn fixedly secured to the rear rube 86, via a pin 104.

With further reference to FIG. 12, one of a pair of multistrand cables 106 is shown along with cable brackets 108, 110 and 112. It will be appreciated that each spool 66 has two separate multistrand cables 106 secured to it in a manner such that rotational movement in a first direction causes one of the cables 106 to be taken up on the spool while simultaneously the other cable 106 is being unspooled. Since each spool 66 has two multistrand cables 106 attached to it, a total of six multistrand cables will extend through each stringer 30 (i.e., twelve total multistrand cables thus being used). As will be described further in the following paragraphs, this enables the step assemblies 32*a*-32*c* to all be rotated from their retracted (vertical) orientation into their extended (horizontal) orientation virtually simultaneously. The multistrand cables 106 are all hidden from view by being routed internally through the tubes 34-38 of each stringer assembly 30.

With brief reference to FIGS. 13 and 14, the coupling of a pair of multistrand cables 106 to one spool 66 is shown. Conduits 107 in FIG. 13 may be fixedly disposed within each stringer assembly 30 to help guide movement of the multistrand cables 106. Cable tensioners 119 may also be included to provide tension and prevent slack from developing in the multistrand cables 106 as they are spool or unspooled from the spool 66. Ball ends 66*a* on an end of each multistrand cable enable the cable to be retained in keyed openings in the spool 66. From FIGS. 13 and 14, it will be apparent that when one of the multistrand cables is unspooled from the spool 66 the other will be simultaneously spooled onto the spool 66. Thus, pivoting movement of the lever 82 works to implement somewhat of a "push/pull" operation on the multistrand cables 106, to thus cause either clockwise or counterclockwise rotational movement of the spool 66.

Cable bracket 108 is operably associated with spool 66 of step assembly 32*c*, while cable bracket 110 is operably associated with spool 66 of step assembly 32*b*, and cable bracket 112 is operably associated with spool 66 of step assembly 32*a*. Each cable bracket 108-112 is pivotally mounted on its associated D-shaft hinge pin 60 and thus is free to pivot. The cable bracket 108 is also visible in FIG. 10.

With further reference to FIG. 11, each multistrand cable 106 is coupled at the upper and lower ends of the cable lever 82. In this manner, when the cable lever 82 pivots in a first rotational direction, the cables 106 each work to rotate the step assemblies 32*a*-32*c* in somewhat of a "push-pull" fashion, and when pivoted in the opposite direction, the multistrand cables 106 operate to rotate the step assemblies substantially simultaneously, but in the opposite rotational direction, using the same "push-pull" action. Thus, pivoting the cable lever 82 in one direction causes the step assemblies 32*a*-32*c* to all be simultaneously pivoted into their extended (i.e., horizontal) orientations, while pivoting the cable lever 82 in the opposite direction causes all of the step assemblies 32*a*-32*c* to be pivoted into their retracted (i.e., vertical) orientations. It will also be noted in FIG. 12 that each multistrand cable 106 extends through one of a pair of openings 112 in each cable bracket 108-112, and thus is contained within the stringer assembly 30 and the rear tube 86.

In operation, the system 10 receives suitable control signals to the dual action hydraulic cylinders 52*a*/52*b*, the hydraulic cylinder 80 and the actuator 21 which cause either an extending (deploying) movement or a retracting movement (i.e., movement into the stowed position). As noted above, the lateral translating movement provided by the actuators 21 is optional, but it is believed that this feature will even further enhance positioning of the step assemblies 32*a*-32*c* when the system 10 is used on various vehicles and structures, and therefore will be desirable in most applications. The following description of operation assumes that the actuators 21 are being employed with the system 10. For example, when the system 10 is in its retracted position and control signals are received to initiate deployment of the system 10, the actuator 21 operates first to move the assembly of stringer assemblies 30 and step assemblies 32*a*-32*c* laterally outwardly away from the vehicle 12 a small distance (e.g., four to 8 inches). Next, the control signals causes the During the extending motion the tubes 34-38 telescopically extend while the step assemblies 32*a*-32*c* are simultaneously being rotated from their stowed to their extending (deployed) orientations by the hydraulic cylinder 80 acting on the multistrand cables 106. Thus, the step assemblies 32*a*-32*c* are moved into horizontally extending positions at about the time that the tubes 34-38 become fully telescopically extended. Of course this sequence could be modified slightly such that the step assemblies 32*a*-32*c* are deployed fully either before or after the tubes 34-38 are fully telescopically extended. Conversely, during retracting movement the step assemblies 32*a*-32*c* are pivoted into vertical orientations simultaneously with retracting telescopic movement of the tubes 34-38 of the stringer assemblies 30. It will also be appreciated then that the system 10 is not limited to having the step assemblies 32*a*-32*c* pivot while the stringers 30 are being telescopically extended or retracted. Pivotal motion of the step assemblies 32*a*-32*c* may instead be initiated as soon as the actuator 21 begins to move the stringer assemblies 30 laterally outwardly away from the vehicle 12 or towards the vehicle, or alternatively after the lateral movement by the actuator 21 has been completed. As such, the system 10 is not limited to any specific sequence of lateral movement, telescopic movement and pivotal movement, when deploying or retracting step assemblies 32*a*-32*c*.

Figure 15:
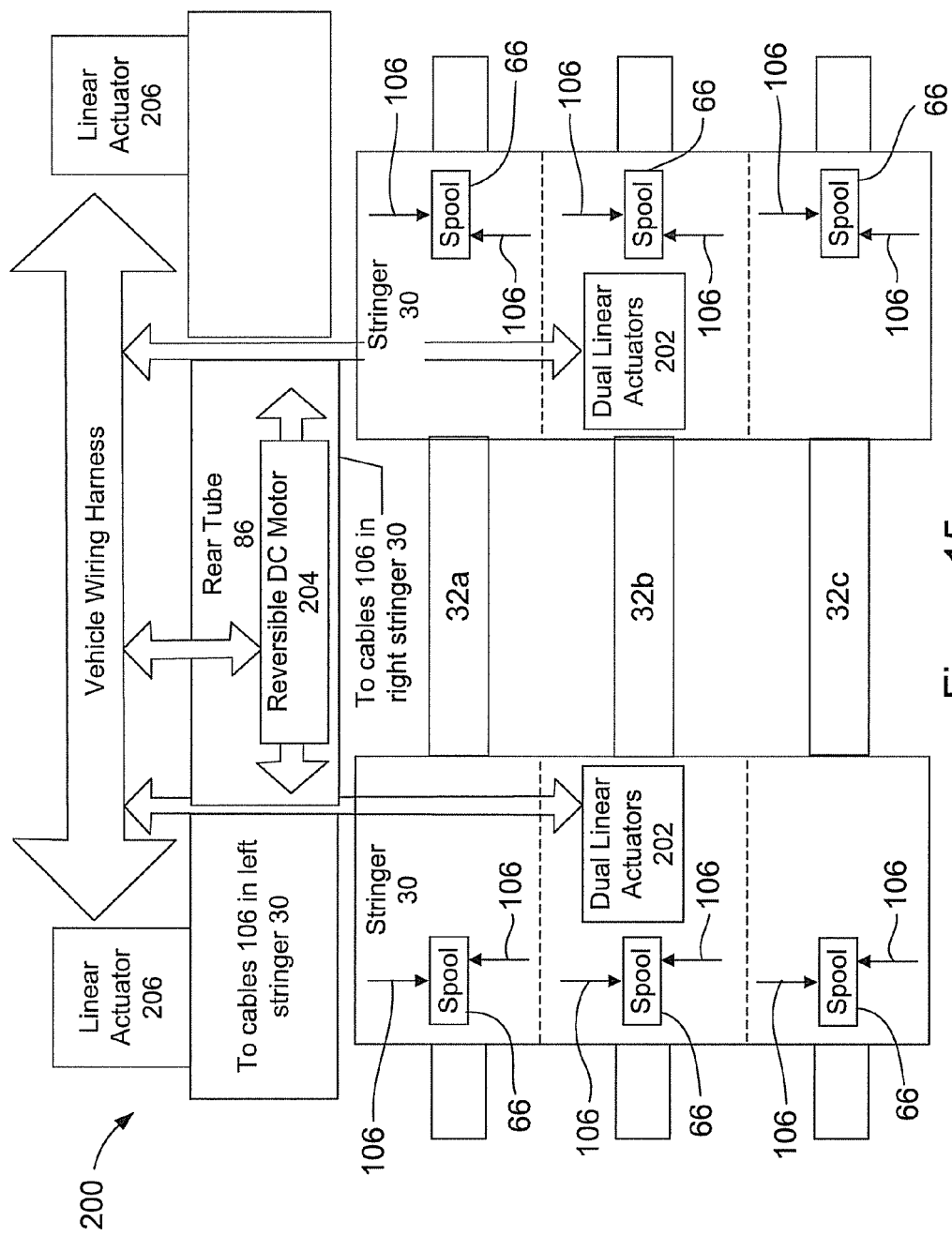
FIG. 15 is a high level block diagram showing another embodiment of the system which makes use a reversible electric DC motor and dual linear actuators for enabling the pivoting motion of the step assemblies and the telescoping movement of the stringers, respectively.

In another embodiment 200 of the system shown in FIG. 15, which is even more suited to passenger cars and trucks, an all-electric drive system is used which includes electrically powered linear actuators 202, a reversible DC electric motor 204, and linear actuators 206. The linear actuators 202, the electric motor 204, and linear actuators 206 may receive signals from a vehicle wiring harness when a key FOB is actuated to unlock a vehicle door, indicating that the occupant is approaching the vehicle and will be entering the vehicle cabin. Likewise, electrical signals are received from the vehicle wiring harness to indicate when the door of the vehicle is opened from the inside by an occupant who is leaving the cabin of the vehicle. In both instances the linear actuators 202, the electric motor 204 and the linear actuators 206 may perform functions that are essentially equivalent to the dual action hydraulic cylinders 52*a*/52*b*, the hydraulic cylinder 80, and the actuators 21, respectively, to provide the retracting and extending movements of the stringers 30, the pivoting movements of the step assemblies 32*a*-32*c*, and the extending/retracting movement of the rear rube 86.

Figure 16:
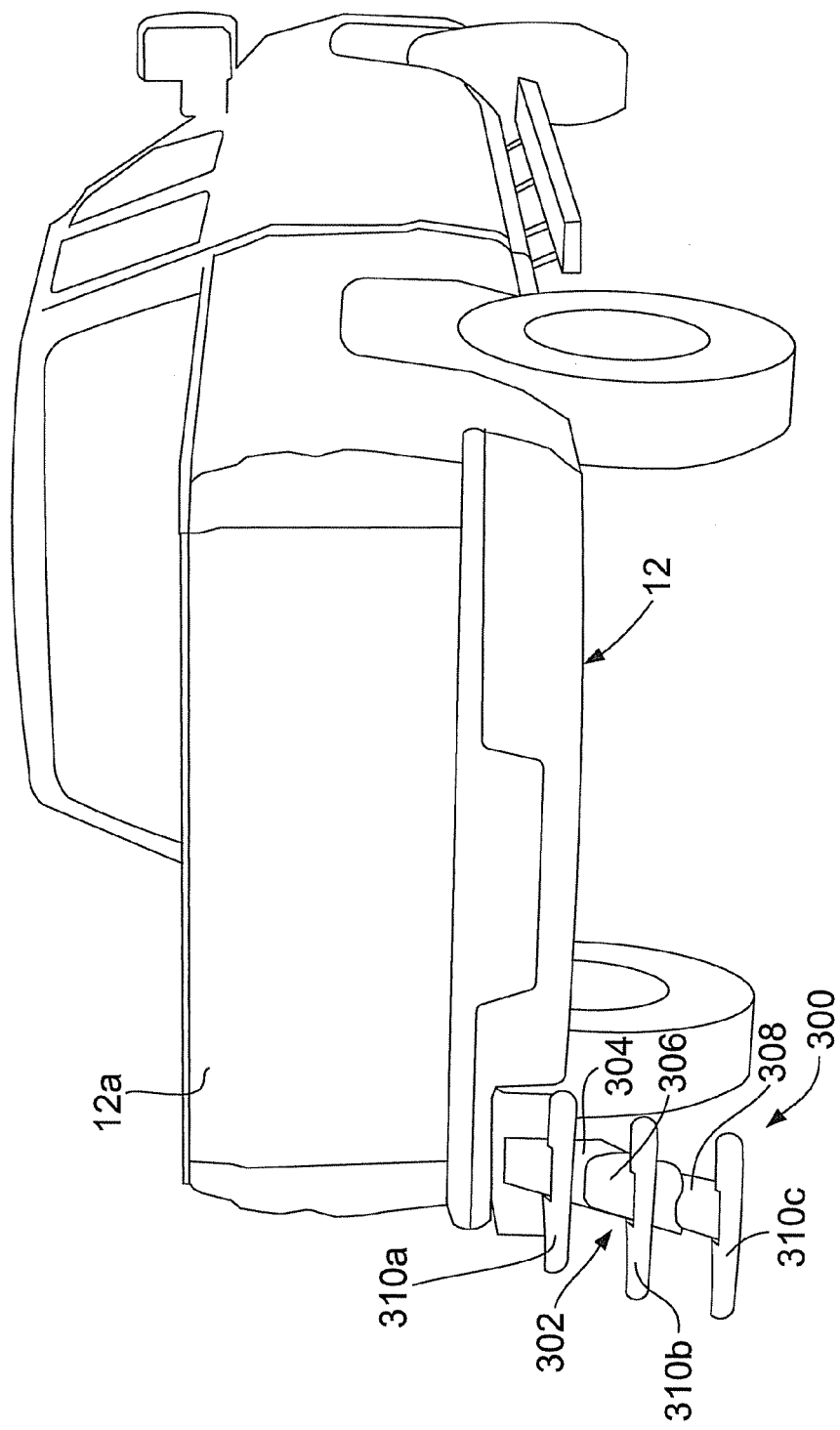
FIG. 16 shows another embodiment of the system of the present disclosure being employed as a step assembly on the rear of a pickup truck.

Referring to FIG. 16, a system 300 in accordance with another embodiment of the present disclosure is shown in which is especially well suited for use with passenger vehicles such as pickup trucks. The system 300 may be constructed substantially identically to the system 10, but as is apparent the system 300 includes only a single stringer 302. The stringer 30 includes tubes 304, 306 and 308 which support pivotal step assemblies 310*a*, 310*b* and 310*c*. Extending and retracting movement of the system 300 may be initiated via a user control, such as a pushbutton, mounted in any convenient location on the system 300 or a convenient location on the vehicle 12. Extending and retracting movement could also be via a key FOB command initiated by the user. Still further, extending and retracting movement could be initiated by a sensor that senses opening and closing of a tailgate 12*a* of the vehicle. As noted earlier, however, it will be appreciated that the system 10 or 300 could be employed on virtually any other type of vehicle or structure where one needs to step up into an elevated cabin or work area, and where there is a need to be able to retract the system 10 or 300 when it is not needed.

With the foregoing embodiments, while a plurality of steps has been shown with each embodiment, it will also be appreciated that the various embodiments described herein could just as readily be constructed with only a single step assembly. Still further, while the various embodiments described herein provide for rotational movement of each of the step assemblies 32*a*-32*c*, it will also be appreciated that one or more, or all, of the step assembly(s) could be fixedly secured to the stringer(s) so that there is no rotation of the step assembly(s) during extending or retracting movement of the stringer.

It will also be appreciated that the vehicle with which the system 10 is being used could include a "car wash" mode that allows the user to lock the system with the step assemblies 32*a*-32*c* in their fully deployed positions, to thus allow easy and convenient washing of the step assemblies. This may be accomplished by a control input provided inside the vehicle, for example somewhere on the dashboard or possibly in the footwell area of the cabin of the vehicle, or possibly even from a command generated from a key FOB. Alternatively such a feature could be implemented on the system 10 itself by the inclusion of a user accessible switch and a microcontroller mounted somewhere on the system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A telescoping step system, comprising:
   at least one stringer assembly having at least first and second tubular components, wherein the second tubular component is telescopically extendable relative to the first tubular component, and wherein the at least one stringer assembly is operably associated with a structure to aid in ingress to and egress from the structure;
   at least one step assembly associated with one of the first and second tubular components;
   wherein the at least one stringer assembly is telescopically collapsible into a retracted position to form a compact assembly at least one of adjacent to the structure or within a portion of the structure, and telescopically extendable into an extended position extending outwardly from the structure to present the at least one step assembly in an orientation which is easily accessible as a platform on which a user is able to step on to, and thus aid the user with ingress into and egress from the structure; and
   wherein the at least one step assembly is pivotally rotatable, relative to the at least one stringer assembly, from a stowed position into an operative position.

2. The system of claim 1, wherein each one of the first and second tubular components includes separate step assemblies.

3. The system of claim 1, wherein the at least one step assembly pivots from the stowed position to the operative position while the at least one stringer assembly is moving from the retracted position to the extended position.

4. The system of claim 1, wherein the at least one step assembly pivots from the operative position to the stowed position while the at least one stringer assembly is moving from the extended position to the retracted position.

5. The system of claim 1, further comprising a powered device fixedly secured to the structure, and operatively coupled to the at least one stringer assembly, for moving the at least one stringer assembly laterally outwardly away from the structure when the at least one stringer assembly is to be moved into the extended position, and moving the at least one stringer assembly laterally toward the structure when the at least one stringer assembly is to be moved into the retracted position.

6. The system of claim 5, wherein the powered device comprises at least one of an hydraulically powered device or an electrically powered device; and
wherein the powered device initiates lateral movement of the at least one stringer assembly when the at least one stringer assembly is to be moved into the extended position, before telescopic extending motion of the at least one stringer assembly begins; and
wherein the powered device initiates lateral movement of the at least one stringer assembly when the at least one stringer assembly is to be moved into the retracted position, after telescopic retracting motion of the at least one stringer assembly begins.

7. The system of claim 1, further comprising a pair of the stringer assemblies, and wherein the pair of the stringer assemblies are controlled for simultaneously extending and retracting telescopic movement.

8. The system of claim 7, further comprising a powered device fixedly secured to the structure, and operatively coupled to each one of the pair of stringer assemblies, for moving the pair of stringer assemblies simultaneously laterally outwardly away from the structure when each one of the pair of stringer assemblies is to be moved into the extended position, and moving the pair of stringer assemblies simultaneously laterally toward the structure when the pair of stringer assemblies is to be moved into the retracted position.

9. The system of claim 1, wherein the structure comprises at least one of a fixed structure or a motor vehicle.

10. A telescoping step system, comprising:
at least one stringer assembly having at least first and second tubular components, where the second tubular component is telescopically extendable relative to the first tubular component, and where the at least one stringer assembly is operably associated with a structure to aid with ingress to and egress from the structure;
a first actuator subsystem for causing telescopic movement of the at least one stringer assembly between extended and retracted positions;
at least one step assembly associated with one of the first and second tubular components, the at least one step assembly being pivotally operatively coupled to the at least one stringer assembly and movable from a stowed position to an operative position;
a second actuator subsystem for causing pivoting motion of the at least one step assembly between the stowed position and the operative position;
wherein the at least one stringer assembly is telescopically collapsible into the retracted position to form a compact assembly at least one of adjacent to the structure or within a portion of the structure, and telescopically extendable into the extended position extending outwardly from the structure to present the at least one step assembly in an orientation which is easily accessible as a platform on which a user is able to step on to, and thus aid the user with ingress into and egress from the structure; and
wherein the at least one step assembly is pivotally movable in response to control by the second actuator subsystem, to position the at least one step assembly in either the stowed or operative positions when the at least one stringer assembly is telescopically moved into the retracted or extended positions, respectively.

11. The system of claim 10, further comprising a third actuator device configured to:
move the at least one stringer assembly laterally outwardly from the structure when deploying the at least one stringer assembly into the extended position; and
move the at least one stringer assembly laterally toward the structure when moving the at least one stringer assembly into the retracted position.

12. The system of claim 10, further comprising a pair of the stringer assemblies for supporting the step assembly adjacent opposing ends of the step assembly.

13. The system of claim 12, wherein both ones of the pair of stringer assemblies have independent ones of the first actuator subsystem.

14. The system of claim 10, wherein the first and second actuator subsystems cooperate to cause pivoting movement of the step assembly simultaneously with telescopic movement of the at least one stringer assembly.

15. The system of claim 14, further comprising a third actuator subsystem for causing lateral movement of the at least one stringer assembly toward and away from the structure, at least one of:
before extending telescopic movement of the at least one stringer assembly begins; or
while telescoping movement of the at least one stringer assembly is taking place; or
after telescoping movement of the at least one stringer assembly has taken place.

16. The system of claim 10, further comprising:
a plurality of cables at least partially routed within the at least one step assembly;
a pulley operably associated with the at least one step assembly and with the plurality of cables; and
the second actuator subsystem acting on the cables to cause rotational motion of the pulley, and thus pivoting motion of the at least one step assembly.

17. The system of claim 10, wherein the first actuator subsystem includes a pair of dual action cylinders disposed within the at least one stringer assembly, and
wherein the at least one stringer assembly includes first, second and third telescopically coupled tube sections operably associated with first, second and third steps of the at least one step assembly.

18. The system of claim 10, wherein the first and second actuator subsystems include electric motors.

19. A method for controlling motion of a movable step associated with a fixed structure, the method comprising:
supporting at least one stringer assembly having at least first and second tubular components from the structure, where the second tubular component is telescopically extendable relative to the first tubular component;
supporting at least one step assembly from one of the first and second tubular components, so that the at least one step assembly is pivotally movable from a stowed position to an operative position, wherein in the operative position the at least one step assembly forms a platform on which a user may step;

using a first actuator subsystem to cause telescopic motion of the at least one stringer assembly between extended and retracted positions;

using a second actuator subsystem to cause pivotal movement of the at least one step assembly between stowed and operative positions, and wherein when the at least one stringer assembly is moved telescopically into the extended position the at least one step assembly will be pivotally moved into the operative position to form the platform upon which the user is able to step.

20. A method for controlling motion of a movable step associated with a fixed structure, the method comprising:

supporting at least one stringer assembly having at least first and second tubular components from the structure, where the second tubular component is telescopically extendable relative to the first tubular component;

supporting at least one step assembly from one of the first and second tubular components, so that the at least one step assembly is pivotally movable from a stowed position to an operative position, wherein in the operative position the at least one step assembly forms a platform on which a user may step;

causing a telescopic motion of the at least one stringer assembly such that the at least one stringer assembly moves between extended and retracted positions; and causing a pivotal movement of the at least one step assembly between stowed and operative positions such that the at least one step assembly is presented as a generally horizontal platform for an individual to step on when the at least one stringer assembly is in the extended position.

* * * * *